Patented June 23, 1953

2,643,255

UNITED STATES PATENT OFFICE 2,643,255

METHOD OF PREPARING PIPERAZINE COMPOUNDS AND A NEW TYPE OF COMPOUND PRODUCED THEREBY

Henri Gustave Prosper Jacob Morren, Forest, Brussels, Belgium, assignor to Union Chimique Belge, S. A., Brussels, Belgium, a corporation of Belgium No Drawing. Application October 19, 1949, Serial No. 122,352. In Belgium and Belgian Congo October 30, 1948

22 Claims. (Cl. 260—268)

This invention relates to a new method of preparing a class of substituted piperazine compounds and at least one new type of compound produced by this method. More particularly, it deals with the preparation of carboxamides of alkyl piperazine and their corresponding normal and acidic salts, which compounds have therapeutic activity, particularly in the treatment of filariasis.

It is an object of this invention to produce such compounds in a simple, efficient, effective and economic manner.

Another object is to produce these compounds directly by reacting the new piperazine halide compounds described in the copending application of Henri Morren, Ser. No. 122,351, filed October 19, 1949, with primary or secondary amines.

Another object is to produce a new type of chemical compound which has therapeutic activity in treating filariasis.

The 1-alkyl-piperazine-4-carboxamide compounds prepared according to the process of this invention have the following general structural formula:

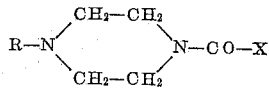

wherein R is a saturated alkyl radical, of straight or branched chain type, containing less than about 10 carbon atoms, and preferably less than about 5 carbon atoms; and wherein X is an alkyl, aryl or alkylaryl primary or secondary amine radical containing less than about 20 carbon atoms, and may also include atoms of other non-metals combined therewith, such as thioamine radicals. For example, the X is a radical of an amine having at least one hydrogen atom attached to the amine nitrogen atom, such as a mono- or di-methylamine, -ethylamine, -propylamine, -isopropylamine, -phenylamine, methylphenylamine, thiodiphenylamine, or the like.

The compounds of this invention also include the normal and acidic salts of organic and inorganic acids of these carboxamides. For example, the 1-alkyl-1-hydrohalide-piperazine-4-carboxamides wherein the hydrohalides are salts of hydrohalic acids, preferably selected from the group consisting of hydrochloric, hydrobromic, and hydroiodic acids; and the normal and acidic salts formed from 1-alkyl-piperazine-4-carboxamides and organic acids, and particularly polybasic organic acids such as maleic, fumaric, citric, etc. acids, because of their water solubility, making them easy to be prepared and administered as pharmaceutical products.

In accordance with the method of this invention, the above mentioned class of piperazine compounds is prepared by reacting one of the new 1-alkyl-piperazine-4-carbonylhalide compounds disclosed in the above mentioned copending Morren application with a primary or secondary amine of the X amine type mentioned above. This reaction is carried out in solution, that is, in the presence of one or more inert solvents for the reactants, such as for example, chloroform, benzene, toluene, xylenes, etc. When three moles of the amine are reacted with one mole of the 1-alkyl-1-hydrohalide-piperazine-4-carbonylhalide according to this process, two moles of the corresponding amine-hydrochloride are produced which may be recovered and used again in the process. To insure complete reaction, the mixture of the reactants may be refluxed for a time, after which the desired product may be purified by evaporation, precipitation, filtration and/or vacuum distillation.

The hydrohalide salts of these carboxamide products may be prepared by treating the corresponding carboxamide with anhydrous hydrogenhalide in an inert solvent solution, such as a solution of chloroform, ethyl ether, or the like. The hydrohalide salts also may be produced directly in certain cases by reacting a 1-alkyl-piperazine-4-carbonylhalide and an amine.

Similarly, the normal and acidic salts of the organic acids of these carboxamides may be produced by treating the 1-alkyl-piperazine-4-carboxamides, preferably in an inert solvent solution (such as of ethyl ether, ethyl alcohol, or mixture thereof), with a quantity of the desired organic acid to produce the acidic or the normal salts thereof. When a quantity of organic acid is employed greater than the quantity required to produce a normal salt, then acidic salts are obtained, for example, when equal molar quantities of a poly-basic organic acid and the carboxamide are employed.

The purification of these hydrohalide and organic acid salts may be effected in the same manner is that described for their carboxamides, namely, by evaporation, precipitation, filtration, vacuum distillation and/or recrystallization from suitable solvent solutions, such as ethyl ether, a solution of 50% ethyl ether and 50% ethyl alcohol, acetone, or the like.

This invention also includes a new type of compound discovered and prepared by the process described above, by reacting thiodiphenylamine with a 1-alkyl-piperazine-4-carbonylhalide to produce the corresponding 1-alkyl-piperazine-4-thiodiphenylcarboxamides and their hydrohalide and acidic and normal organic acid salts, in particular the new compound 1-methyl-1-hydrochloride-piperazine - 4 - thiodiphenylcarboxamide.

The above mentioned and other features and objects of this invention and the manner of attaining them will become more apparent and the invention itself will be best understood by reference to the following specific examples of the preparation of different compounds of the class involved, as well as a specific example of a new type of compound.

Example I

1 - methyl - piperazine - 4 - NN - diethylcarboxamide was prepared by adding a little at the time of a 0.2 molar quantity of 1-methyl-1-hydrochloride-piperazine-4-carbonylchloride (prepared according to the method described in the above mentioned copending Morren application) to a 0.6 molar quantity of anhydrous diethylamine dissolved in 300 cubic centimeters (cc.) of chloroform. Since the reaction was exothermic, this addition caused the mixture to heat to boiling. Then the mixture was refluxed for one hour at atmospheric pressure after which it was evaporated to dryness under vacuum. The residue was then treated with anhydrous ethyl ether and the resulting insoluble precipitate, which was separated by filtration, consisted of a 0.4 molar quantity of diethylamine-hydrochloride, which may be recovered, liberated and used again as the reacting amine in this process. The resulting filtrate, or ether solution, was then heated to drive off the ethyl ether and the residue was vacuum distilled at a pressure of about 3 mm. of mercury. The fraction which distilled over between the temperatures of 110° and 115° C. was 1 - methyl-piperazine - 4 - NN - diethylcarboxamide, weighed 28 grams, crystallized rapidly into a white crystalline solid, and had a melting point of approximately 50° C.

These 28 grams of carboxamide just produced were then dissolved in 70 cc. of chloroform and the resulting solution was saturated at room temperature with anhydrous hydrogenchlorde. The chloroform solvent was then evaporated off under vacuum and the resulting residue was again treated with chloroform and re-evaporated under vacuum until the residue had a constant weight. The resulting white crystalline residue was then recrystallized in a solution of anhydrous acetone, and 28 grams of 1-methyl-1-hydrochloride-piperazine-4-NN-diethylcarboxamide were obtained having a melting point of 156°–157° C.

Example II

In a manner similar to that employed in Example I above, a 0.2 molar quantity of 1-methyl-1 - hydrochloride - piperazine - 4 - carbonylchloride was added to a 0.6 molar quantity of dimethylamine dissolved in 300 cc. of chloroform. When the reaction in the mixture caused by the addition quieted down, the mixture was refluxed for one hour at atmospheric pressure. Then the mixture was evaporated to dryness under vacuum and the residue was treated with anhydrous ethyl ether, from which treatment approximately 32 grams of dimethylamine-hydrochloride were filtered out. The ether in the filtrate was then evaporated and approximately 34 grams of crude 1-methyl-piperazine-4-NN-dimethylcarboxamide were obtained. This crude carboxamide was then dissolved in ethyl ether and treated with a current of anhydrous hydrogenchloride. The resulting white product formed was filtered, and after being recrystallized several times from a solution of 50% ethyl alcohol and 50% ethyl ether, 25 grams of 1-methyl - 1 - hydrochloride - piperazine - 4 - NN-dimethylcarboxamide were obtained having a melting point of 179°–180° C.

Example III

A 0.2 molar quantity of 1-methyl-1-hydrochloride - piperazine - 4 - carbonylchloride was added to a 0.6 molar quantity of di-isopropylamine dissolved in 300 cc. of chloroform, and processed similarly to that described in Example II above, to obtain approximately 55 grams of di-isopropylamine-hydrochloride and 45 grams of crude 1 - methyl - piperazine - 4 - NN - di - isopropylcarboxamide. By treating this crude carboxamide in an ethyl ether solution with a current of anhydrous hydrogenchloride and recrystallizing the resulting precipitated product from a 50%–50% solution of ethyl alcohol and ethyl ether, 30 grams of 1-methyl-1-hydrochloride-piperazine-4-NN-di-isopropylcarboxamide were obtained having a melting point of 204° C.

Example IV

A 0.2 molar quantity of 1-methyl-1-hydrochloride - piperazine - 4 - carbonylchloride was added to a 0.6 molar quantity of monoethylamine dissolved in 300 cc. of toluene. The resulting mixture was then refluxed for one hour at a temperature of 100° C. and at atmospheric pressure, and then after cooling to room temperature, 300 cc. of ethyl ether was added and the resulting mixture was filtered. 32 grams of mono-ethylamine-hydrochloride were recovered, and the solvents were evaporated from the filtrate under vacuum. The residue was then distilled at a pressure of about 0.1 mm. of mercury, and 25 grams of 1-methyl-piperazine-4-N-ethylcarboxamide boiling at 120–122° C. at 0.1 mm. pressure were obtained. This product was then dissolved in ethyl ether and treated with a current of anhydrous hydrogenchloride. The precipitated salt obtained was then crystallized from a 50%–50% solution of ethyl ether and ethyl alcohol and finally 27 grams of 1-methyl-1-hydrochloride - piperazine - 4 - N - ethylcarboxamide were obtained having a melting point of 176°–177° C.

Example V

A new type of compound: 1-methyl-1-hydrochloride - piperazine - 4 - thiodiphenylcarboxamide having the following structural formula:

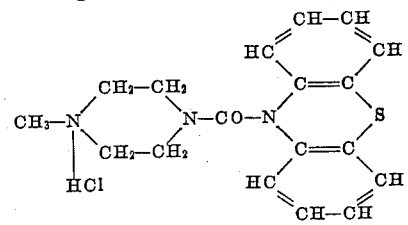

was prepared directly by adding 8 grams of 1-methyl - piperazine - 4 - carbonylchloride to 10 grams of thiodiphenylamine dissolved in 100 cc. of anhydrous chloroform and refluxing the resulting mixture at atmospheric pressure for two hours. Then the mixture was evaporated nearly to dryness and ethyl ether was added to precipitate out a white crystalline substance which was then separated by filtration and recrystallization in a solution of anhydrous ethyl alcohol. 9 grams of pure crystal of 1-methyl-1-hydrochloride-piperazine-4-thiodiphenylcarboxamide were obtained having a melting point of 229°–231° C.

*Example VI*

The 1 - methyl - 1 - maleate - piperazine - 4-NN-diethylcarboxamide was prepared by adding to a 0.1 molar quantity of 1-methyl-piperazine-4-NN-diethylcarboxamide dissolved in 200 cc. of ethyl ether while being mechanically stirred, a 0.1 molar quantity of maleic acid dissolved in three times its weight of absolute ethyl alcohol. The stirring was continued for one hour and the precipitated salt formed was filtered off and recrystallized from a 50%–50% solution of ethyl ether and ethyl alcohol. The resulting crystallized acidic salt was 1-methyl-1-maleate-piperazine-4-NN-diethylcarboxamide having a melting point of 127° C. and was readily soluble in water.

*Example VII*

1 - methyl - 1 - fumarate - piperazine - 4 - NN-diethylcarboxamide was prepared in the same manner as that described in Example VI above, but an alcoholic solution of fumaric acid was employed instead of maleic acid. This fumarate salt was found to be a white crystalline solid having a melting point of 132° C. and was also readily soluble in water.

*Example VIII*

1 - methyl - 1 - citrate - piperazine - 4 - NN-diethylcarboxamide was also prepared in the same manner as that described in Example VI above, but an alcoholic solution of citric acid was employed instead of maleic acid. The resulting citrate salt was a white crystalline solid, had a melting point of 134° C., and was readily soluble in water.

Although the specific examples given above are directed to the 1-methyl-piperazine-carboxamide, other 1-alkyl-piperazine-carboxamides may be prepared in the same manner within the scope of this invention. Also, the secondary amines employed in making these compounds may contain other hydrocarbon and organic radicals than those specifically mentioned, and other organic acid salts of the compounds may be prepared in a similar manner to those described in the last three examples. The only reason for specifically disclosing poly-basic organic acid salts of these compounds was because these salts are more soluble in aqueous solutions making them easier to administer to patients suffering from filariasis, against which disease these compounds have been found to be very active.

While there is described above the principles of this invention in connection with specific examples, it is to be clearly understood that this description is made only by way of example and not as a limitation to the scope of this invention.

What is claimed is:

1. A method for producing a compound of the group consisting of: 1-alkyl-piperazine-4-carboxamides and their acid salts, said carboxamides having the formula:

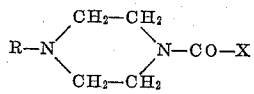

wherein R is a saturated alkyl radical of less than 10 carbon atoms, and wherein X is an amine radical selected from the group consisting of alkyl and aryl primary and secondary amines containing less than 20 carbon atoms, said method comprising: reacting a corresponding 1-alkyl-piperazine-4-carbonylhalide compound with a corresponding amine.

2. The method of claim 1 wherein said R radical is a methyl radical.

3. Compounds of the type of 1-alkyl-1-hydrohalide-piperazine-4-thiodiphenylcarboxamide.

4. 1 - methyl - 1 - hydrochloride - piperazine-4-thiodiphenylcarboxamide.

5. The method of claim 1 wherein said reaction is carried out in the presence of an inert liquid solvent solution.

6. The method of claim 5 wherein said solvent is chloroform.

7. The method of claim 1 wherein said reaction is carried out by refluxing a solvent mixture of the reactants.

8. The method of claim 1 wherein said 1-alkyl-piperazine-4-carbonylhalide compound is a 1-alkyl - 1 - hydrohalide-piperazine - 4 - carbonylhalide.

9. The method of claim 8 wherein said hydrohalide radical is the hydrochloride radical.

10. A method of producing 1-alkyl-1-hydrohalide - piperazine - 4 - carboxamides comprising: reacting a corresponding 1-alkyl-piperazine-4-carbonylhalide compound with an amine containing less than 20 carbon atoms per molecule in the presence of a solvent to produce the corresponding 1-alkyl - piperazine - 4 - carboxamide, and then treating said latter carboxamide in the presence of a solvent with a hydrogenhalide.

11. A method of producing 1-alkyl-piperazine-4-carboxamides comprising: reacting in solution one mole of a corresponding 1,1-alkyl-hydrohalide - piperazine - 4 - carbonylhalide with three moles of an amine containing less than 20 carbon atoms per molecule and having at least one hydrogen atom attached to its nitrogen atom.

12. A method of producing 1-alkyl-1-hydrohalide-piperazine-4-carboxamide comprising: reacting in solution a corresponding 1-alkyl-piperazine-4-carbonylhalide with an equal molar quantity of an amine containing less than 20 carbon atoms per molecule and having at least one hydrogen atom attached to its nitrogen atom.

13. A method of producing an acid salt of an organic acid of a 1-alkyl-piperazine-4-carboxamide prepared according to the method of claim 1 comprising: reacting in solution an organic acid and the corresponding 1-alkyl-piperazine-4-carboxamide.

14. The method of producing the acid salts of claim 13 wherein said organic acid is a poly-basic acid.

15. The method of claim 13 wherein said organic acid is maleic acid.

16. The method of claim 13 wherein said organic acid is fumaric acid.

17. The method of claim 13 wherein said organic acid is citric acid.

18. The method of claim 13 wherein said treating is with stoichiometric quantities of said organic acid and carboxamide to produce a neutral carboxamide salt.

19. The method of claim 13 for producing acidic salts wherein said treating is with a quantity of said organic acid greater than the stoichiometric quantity required to produce a neutral salt.

20. A method of producing an acid salt of an organic acid of a 1-alkyl-piperazine-4-carboxamide comprising: reacting a corresponding 1-alkyl-piperazine-4-carbonylhalide with an amine containing less than 20 carbon atoms per molecule to produce the corresponding 1-alkyl-piperazine-4-carboxamide, and treating the latter with an organic acid.

21. The method of claim 20 wherein said treating step is carried out in solution.

22. The method of claim 21 wherein said solution is an inert solvent solution.

HENRI GUSTAVE PROSPER
JACOB MORREN.

References Cited in the file of this patent

Morren et al., Bull. Soc. Chim. Belges 58, 103–111 (1949).

Houben-Weil, Die Methoden der Organischen Chemie, vol. 4, p. 537, third edition (1941).

Shriner et al., J. Am. Chem. Soc. 53, 1601–1605 (1931).

Richter, Textbook of Organic Chemistry, p. 235 (1938), John Wiley and Sons, Inc., New York, N. Y.

Werner, J. Chem. Soc. 115, 1013 (1919).

Kushner et al., J. Org. Chem, 13, 144–153 (1948).